United States Patent
Bertetti et al.

(10) Patent No.: US 6,978,729 B2
(45) Date of Patent: Dec. 27, 2005

(54) CONTROL SYSTEM FOR BOATS

(75) Inventors: Paolo Bertetti, Turin (IT); Giacomo Negro, Santena (IT)

(73) Assignee: Azimut-Benetti S.p.A., Viareggio (IT)

( * ) Notice: Subject to any disclaimer, the term of this patent is extended or adjusted under 35 U.S.C. 154(b) by 0 days.

(21) Appl. No.: 10/956,305

(22) Filed: Oct. 1, 2004

(65) Prior Publication Data

US 2005/0075016 A1   Apr. 7, 2005

(30) Foreign Application Priority Data

Oct. 3, 2003  (IT) .......................... TO2003A0779

(51) Int. Cl.[7] ............................................ B63H 25/00
(52) U.S. Cl. .................... 114/144 R; 114/151; 440/1; 440/87
(58) Field of Search ............................ 114/144 R, 151; 440/1, 38, 84, 87

(56) References Cited

U.S. PATENT DOCUMENTS

| | | | |
|---|---|---|---|
| 6,273,771 B1 * | 8/2001 | Buckley et al. ............... | 440/84 |
| 6,308,651 B2 * | 10/2001 | McKenney et al. ..... | 114/144 R |
| 6,350,164 B1 * | 2/2002 | Griffith et al. ................. | 440/6 |
| 6,401,644 B2 * | 6/2002 | Fadeley et al. ............. | 114/151 |
| 2002/0042233 A1 * | 4/2002 | Michel et al. ................ | 440/38 |

FOREIGN PATENT DOCUMENTS

| | | |
|---|---|---|
| JP | 10181692 | 7/1998 |
| WO | 00/13967 | 3/2000 |
| WO | 02/085702 A1 | 10/2002 |

* cited by examiner

*Primary Examiner*—Stephen Avila
(74) *Attorney, Agent, or Firm*—Merchant & Gould P.C.

(57) ABSTRACT

A boat has installed therein a primary propulsion system to produce a thrust at least in the longitudinal direction, manual controls for controlling the primary propulsion system, a transverse propulsion system for producing a transverse thrust, and a joystick control for controlling the primary and transverse propulsion systems for navigation at slow speed or in docking manoeuvres. An electronic control unit controls the propulsion systems and receives information on the instantaneous speed of the boat and on the instantaneous distance between the boat and an obstacle such as the coast, the bottom or floating or half-submerged bodies. The electronic unit is so arranged that when the boat is located at a distance from an obstacle less than a predetermined distance it controls the propulsion systems to reduce the speed of the boat to below a predetermined limit, disables the manual controls of the primary propulsion system and enables the joystick control.

7 Claims, 10 Drawing Sheets

FIG. 4 OPEN WATER MODE NAVIGATION PHASE SELECTION

FIG. 5 REVERSING MODE NAVIGATION PHASE SELECTION

FIG. 6
OPEN SEA NAVIGATION (MORE THAN ½ MILE)

FIG. 7

COASTAL NAVIGATION (WITHIN ½ MILE, 6 KNOT SPEED LIMIT)

FIG. 8
RESTRICTED WATER NAVIGATION

FIG. 9
OPEN SEA/REVERSING MODE SPEED LIMITATION

FIG. 10
CONTROL MODE SELECTION

FIG. 11

CONTROL SYSTEM FOR BOATS

The present invention relates to a control system for boats, in particular for governing the boat during slow speed navigation phases in narrow waters and to assist docking manoeuvres.

The growing increase in maritime traffic, dangerous objects floating adrift, and speed limitations impose a greater workload on the pilot.

The invention is intended to be implemented particularly on boats such as yachts comprising
- a main propulsion system with one or two screw propellers at the stern able to produce a thrust in the longitudinal direction of the hull;
- a transverse propulsion system with at least one bow thruster to produce a thrust in a direction transverse to the hull;
- a primary control device for controlling the main propulsion system;
- a secondary control device of the joystick type for controlling the main and transverse propulsion systems for navigation at low speed or in docking manoeuvres.

The patent publications WO-02/085702, WO-00/13967 and JP-10-181692 describe control systems of the general type described above, that is to say which make use of a joystick control device for manoeuvres or navigation at slow speed.

In this field there is felt a need to assist and facilitate manoeuvres of the boat in restricted waters or where speed limits exist as well as to guarantee the possibility of intervention in the case of a collision risk.

A general object of the present invention is therefore that of making navigation more secure, in particular in proximity to or during approach to fixed obstacles as well as improving the control of the boat.

Another object of the invention is to improve respect for the rules which establish given speed limits as a function of the proximity to the banks.

These and other objects and advantages which will be understood better hereinafter are achieved by a control system having the characteristics defined in the annexed claims. In summary, the invention proposes an auxiliary manoeuvring and navigation system for a boat, which can automatically limit the speed of a boat approaching a bank or a jetty, or in the presence of obstacles detected by one or more detection systems. The speed limitation is associated with automatic activation of a control device of the joystick type for total control of all the propulsion units and the direction of the boat. One of the more important characteristics and advantages of the present invention is given by the fact that, as will be explained in detail below, in the slow speed navigation mode in which the joystick control device is active, the power of the motor or motors of the main propulsion system is not limited in an unequivocal manner to a maximum pre-established speed, but by the speed of the boat, for which limits are established automatically as a function of the proximity of the obstacle detected. In this way the pilot can have the full power of the motors available when he must effect a sharp deceleration by controlling the motors in the reverse sense to the direction of advance of the boat at that time. This possibility makes the manoeuvre of approaching and docking at a fixed structure simpler and safer.

Various preferred but non-limitative embodiments of the invention will now be described; reference is made to the attached drawings, in which.

The practical and functional characteristics of many of the elements, devices and equipment described hereinafter are already known per se and will therefore not be described here in detail.

Figure 1:
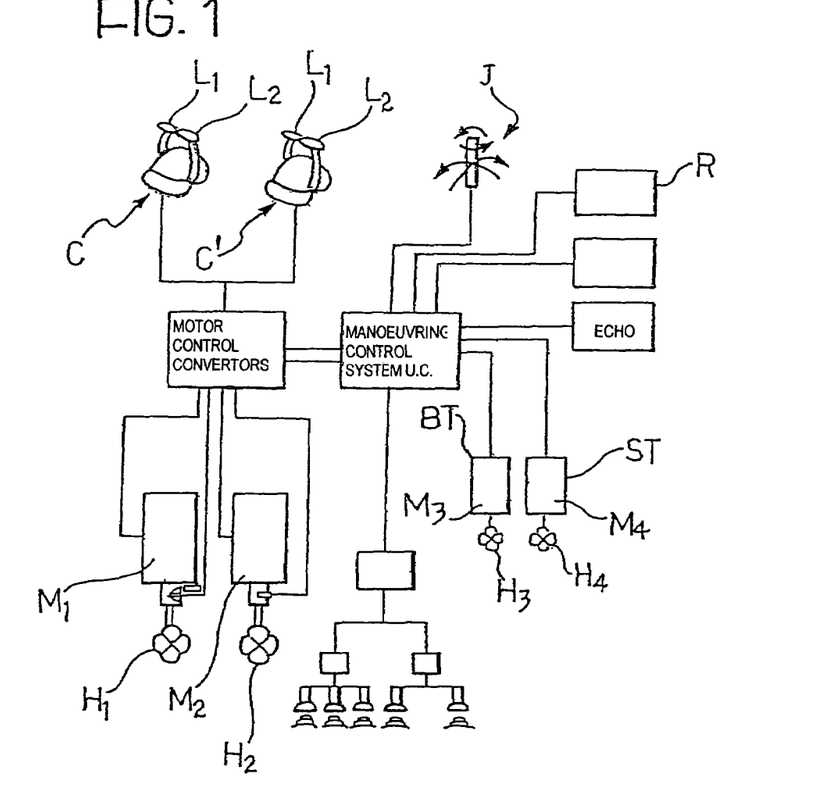
FIG. 1 schematically illustrates the controls, the propulsion and direction control members of a boat, and apparatus for detecting the distance of the boat from an obstacle.

Initially making reference to FIG. 1, a boat is provided with a pair of primary propulsion motors M1, M2 which drive respective stern screw propellers H1, H2 and which are controlled by control levers L1, L2 of one or two primary control devices C and C', one of which can be disposed in the control cabin and the other on the bridge, if the boat is a yacht of this type. In the present example the primary propulsion system is of azimuth type with propellers H1, H2 orientable in an azimuth or horizontal plane in such a way that the thrust exerted by the propellers H1, H2 does not only produce a thrust in the longitudinal direction of the hull, but can be oriented according to different directions.

The boat includes a comprehensive transverse propulsion system of so-called bow thrusters and stern thrusters which include motors M3, M4 to produce reversible thrust to left and right and vice versa by means of transverse screw propellers H3, H4 at the stern and bow.

A secondary control device of joystick type is indicated J, for controlling the primary and transverse propulsion systems for navigation at slow speed or in docking manoeuvres.

The operation of all the propulsion and direction control members of the boat (including possible rudders, not illustrated) is controlled by a central control and processor unit UC which monitors the control of the boat as a whole and which receives signals from a plurality of devices, described hereinbelow, mounted on board the boat for detection of obstacles.

The boat is provided with one or more systems which detect in real time the distance of the boat from an obstacle and makes this distance information available to the processor and control unit UC. In the present description and in the annexed claims the term "obstacle" will be interpreted in a wide sense, including any element for potential collision, such as the bank, the bottom, fixed structures of a bridge, floating bodies of various types, other vessels, half-submerged bodies such as rocks etc.

The detection equipment preferably comprises more than one of the following:
- radar apparatus R and/or a GPS satellite system;
- a distance sensor system mounted at the stern and/or at the bow, including a plurality of receiver-transmitters RT which emit acoustic signals in the form of beams rearwardly from the stern and/or forwardly from the bow and which receive acoustic signals from a possible obstacle appearing on the surface at a distance of about from 1 to 15 metres from the boat. Each receiver-transmitter includes a transducer for converting the acoustic signals reflected from the obstacle into electrical signals which are then provided to the central unit UC. The time required for the return of the reflected pulse is measured electronically;
- an echo scanner (ECHO) or other instrument of sonar type for measuring the depth of the bottom and identifying/locating submerged objects by means of the return of a sound pulse transmitted vertically towards the bottom from a transducer (for example of piezoelectric type) positioned on the hull of the boat.

The GPS system and/or the radar apparatus R provide information in real time on the instantaneous speed of the boat. If these instruments are not included in the equipment on board, then to put the present invention into effect the boat must be provided with another detector device for detecting the instantaneous speed, for example a propeller speed transducer (LOG). Alternatively, data on the speed of the boat could be derived from the speed of rotation of one of the motors of the primary propulsion system.

On the basis of the distance data received by the detection apparatus, the control unit UC is arranged to recognise different phases or conditions of navigation and, as a consequence of the phase in progress at any one time, automatically to enable or disable the functioning of the joystick. In particular, the unit UC automatically limits the speed and enables the joystick control system in coastal navigation conditions, in restricted water conditions and during docking. The speed limits are automatically removed and the auxiliary joystick control system disabled for navigation on the open sea.

The phases of navigation are as follows.

Open sea navigation (more than half a mile from the coast for Europe or according to national limits);

coastal navigation (within half a mile of the coast, speed limit 6 knots for Europe or according to national limits);

navigation in restricted water (channels, ports etc., speed limit 3 knots for Europe or according to national limits);

docking.

If the detection apparatus does not signal the presence of an obstacle within a radius of half a mile from the boat, the auxiliary joystick control system is normally disabled. During this open sea phase of navigation the control unit UC is capable of automatically limiting the speed of the boat by reducing the motor speed whenever the bow sensor system detects the presence of a floating obstacle or the radar detects another vessel or obstacle. The speed reduction takes place with a deceleration curve such as not to cause risks to the passengers. Contemporaneously with commencement of the deceleration phase the control unit UC can activate a suitable alarm. The final speed value will be preferably determined as a function of the current speed and distance from the obstacle.

In a preferred embodiment of the invention the possibility is envisaged of voluntarily disabling the auxiliary control system in any navigation condition by means of a bypass control which can be actuated only intentionally by whoever is steering the boat. By acting on a suitable RTO (rapid take over) control it is possible to effect an "override" of the speed limitation thereby immediately reinstating control of the primary propulsion motors by means of the primary control devices C and C'. At any moment, above all in case of need, for example upon detection of an obstacle (such as, for example, another vessel), the pilot can decide whether:

to monitor the situation by leaving the system which automatically reduces the speed to intervene, or to increase the power delivered by the primary motors and therefore the speed of the boat by reactivating the primary control devices C and C' by means of the RTO control whereby to prevent impact with the obstacle.

When the GPS or radar system signals the presence of the coast within a distance of half a mile from the boat ("coastal" navigation phase), the control unit UC sets the automatic limitation of the speed to 6 knots. This limitation can also be caused by the echo scanner if this detects that the bottom is at a depth less than a predetermined value, for example ten metres. If the boat is coming from open sea navigation the speed reduction will preferably take place with a deceleration curve such as not to cause risks to the passengers. Simultaneously with the commencement of the deceleration phase the control unit UC can activate a suitable acoustic warning signal. Moreover, the commencement of the deceleration phase will preferably take place with a certain anticipation (as a function of the current speed and the deceleration curve) in such a way as to allow the entry into coastal navigation to occur at 6 knots.

If the boat is coming from docking, the system will limit the maximum speed to 6 knots until passing beyond costal navigation waters. The determination of the width of the strip in which the limitation applies will take place with the aid of the interfaced radar and/or GPS.

During navigation in the coastal strip the auxiliary manoeuvring system based on the joystick is operative whenever the vessel's commander has not exercised the RTO option therefore exceeding the 6 knot limit. Thus the joystick is operative and usable below 6 knots, and within the 6 knot range the auxiliary system has complete authority over all controls including the directional rudders.

When the detection apparatus signals the presence of an obstacle within 300 metres from the boat ("restricted water" navigation phase) the control unit UC sets the automatic limitation of the speed to 3 knots. This limitation can also be caused by the echo scanner if this detects that the bottom is at a depth less than a predetermined value, for example 5 metres. If the boat is coming from coastal navigation the speed reduction will be gradual and possibly accompanied by the emission of an acoustic warning signal. Moreover the deceleration will commence preferably with a certain anticipation (as a function of the current speed and the deceleration curve) in such a way as to allow the boat to enter the restricted navigation area at 3 knots. During operations in restricted water the auxiliary manoeuvring system based on the joystick is likewise operative as long as the commander has not exercised the RTO option thus exceeding the 3 knot limit. Therefore the joystick is operative and usable below 3 knots, and within the 3 knot range the auxiliary system has complete authority over all the commands including the directional rudder.

If the boat is coming from docking the unit UC will limit the maximum speed to 3 knots, the determination of the limitation band will take place with the aid of the obstacle detection system or, alternatively, with the GPS/radar (the presence of an obstacle within 300 metres will automatically activate the restricted water navigation mode).

Figure 2:
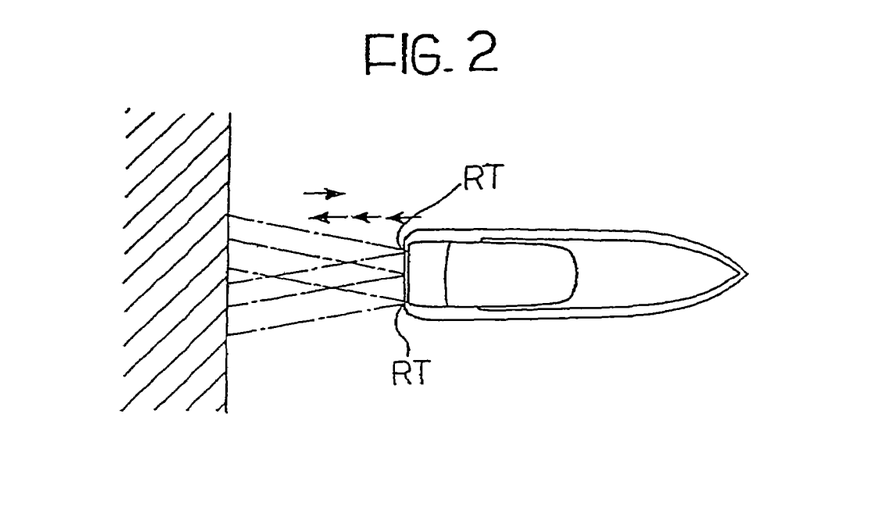
FIG. 2 is a view from above of a boat provided with a system according to the invention during docking; and FIGS from 3 to 11 are flow diagrams which illustrate various operative modes of the system of the present invention.
Figure 3:
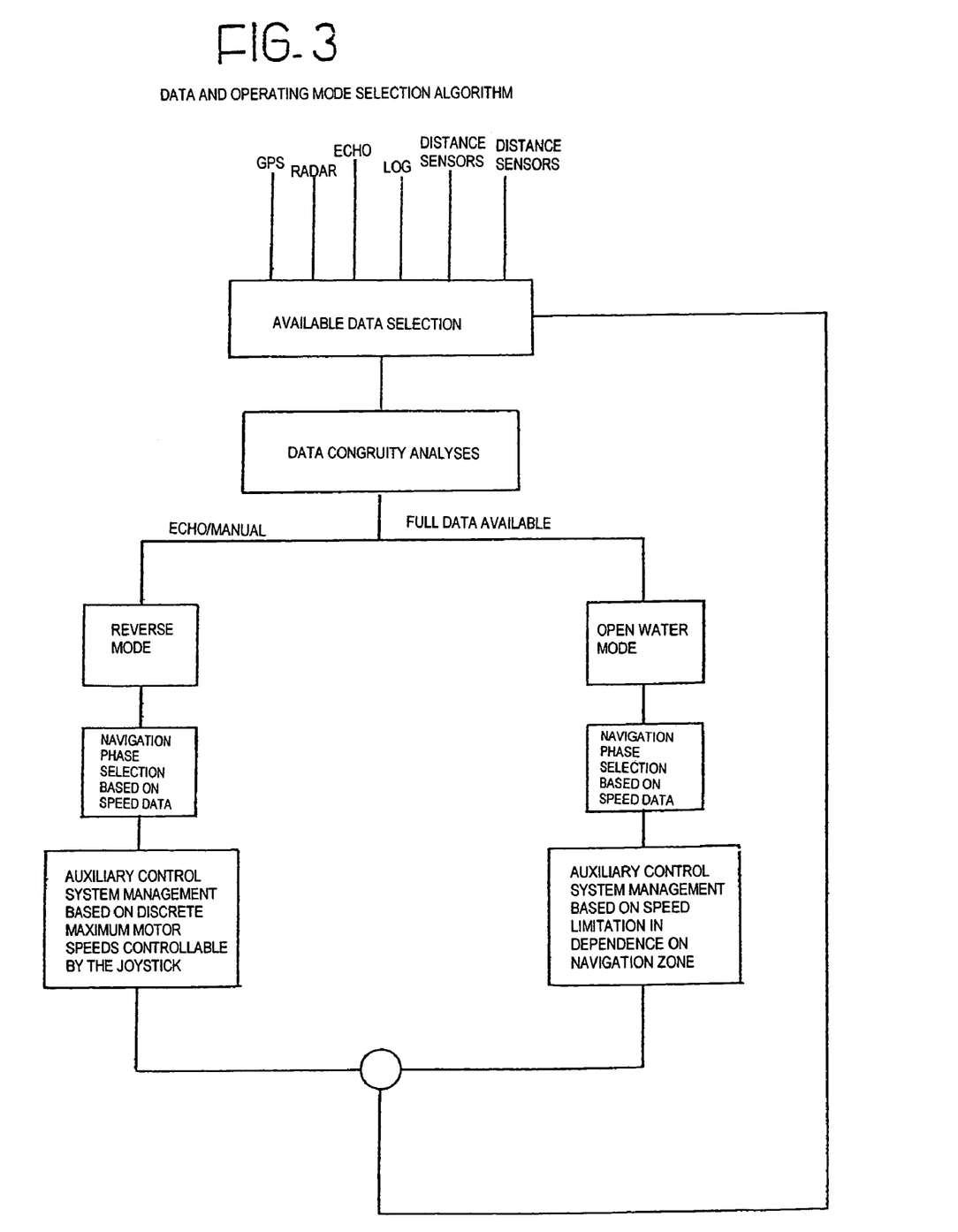
Figure 4:
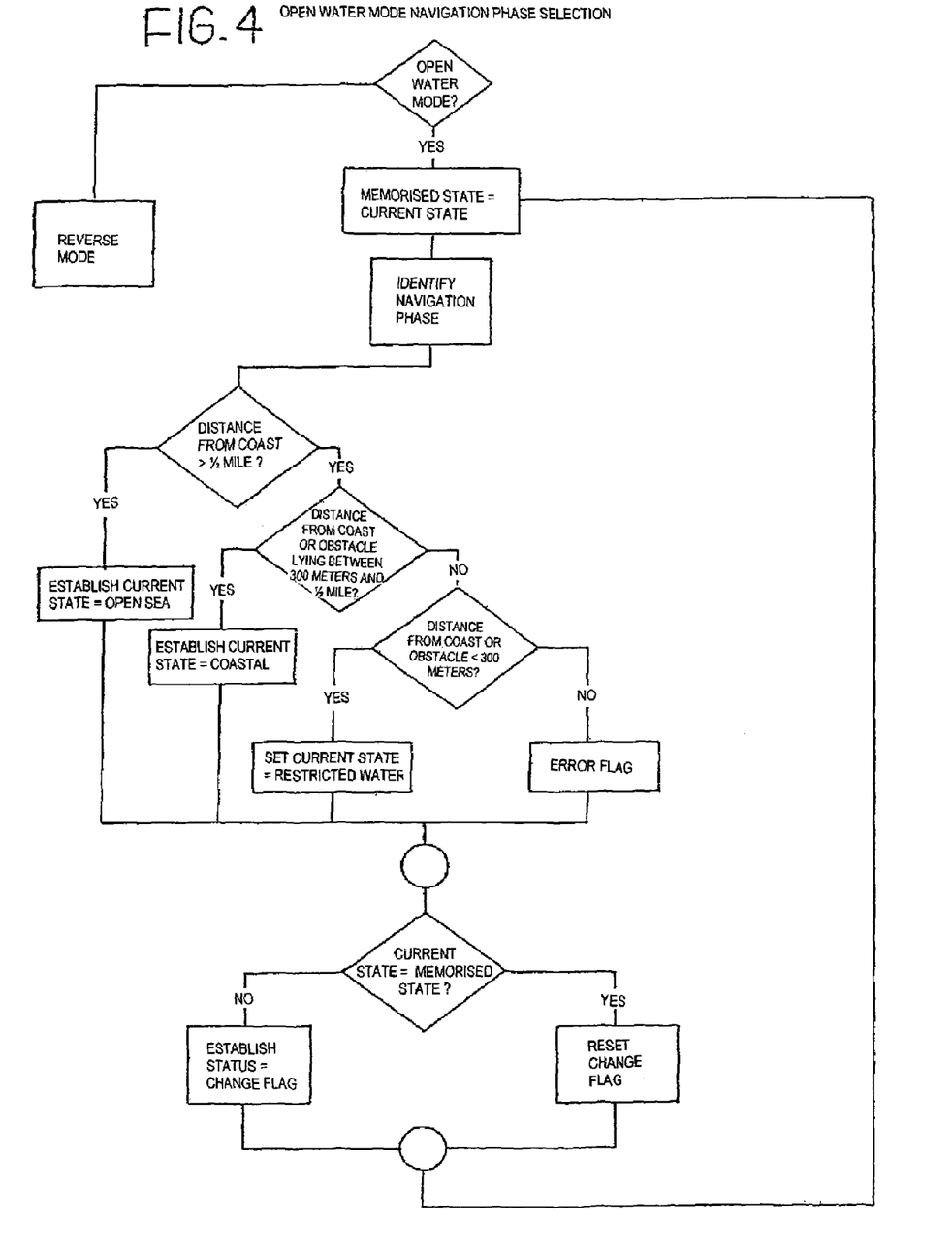
Figure 5:
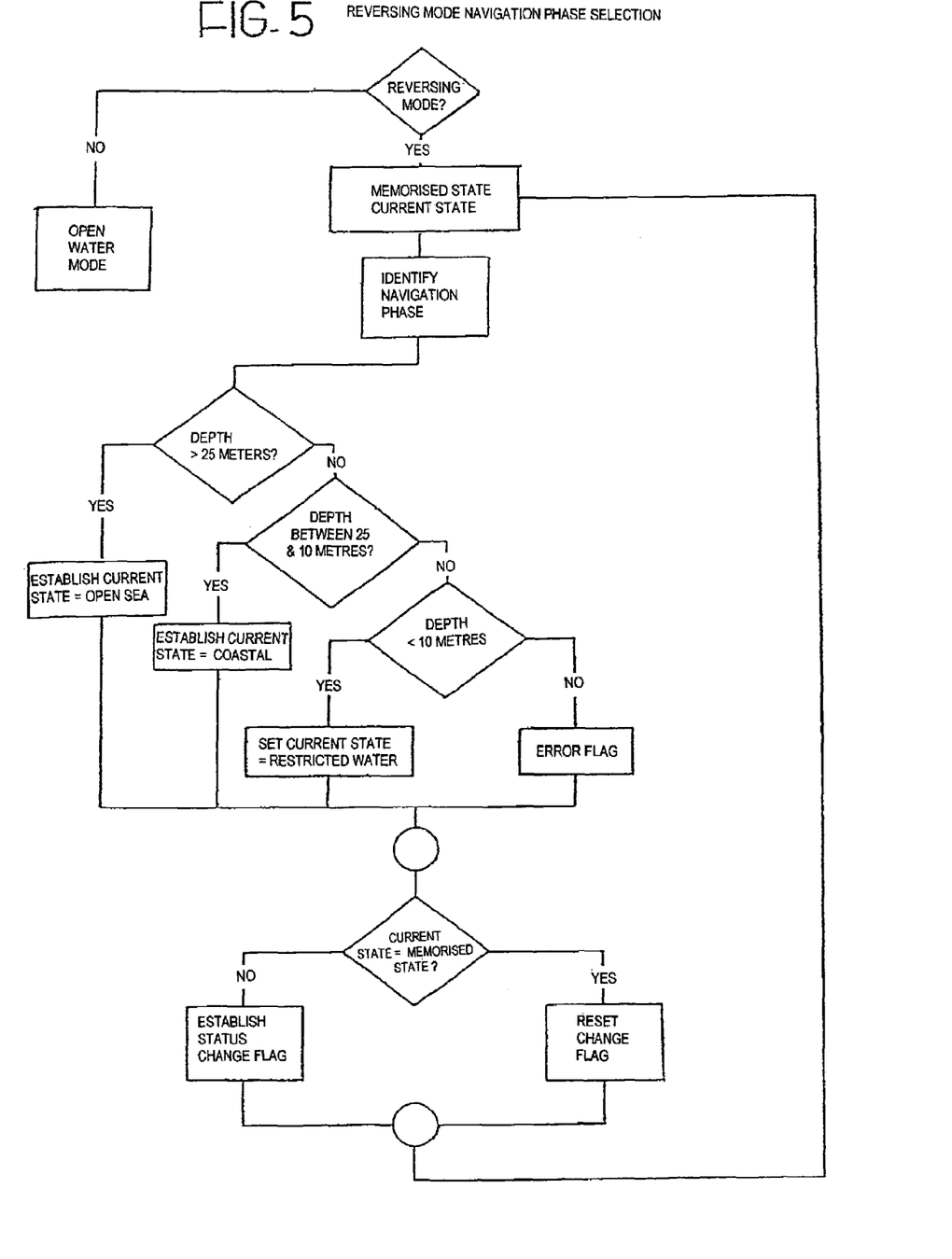
Figure 6:
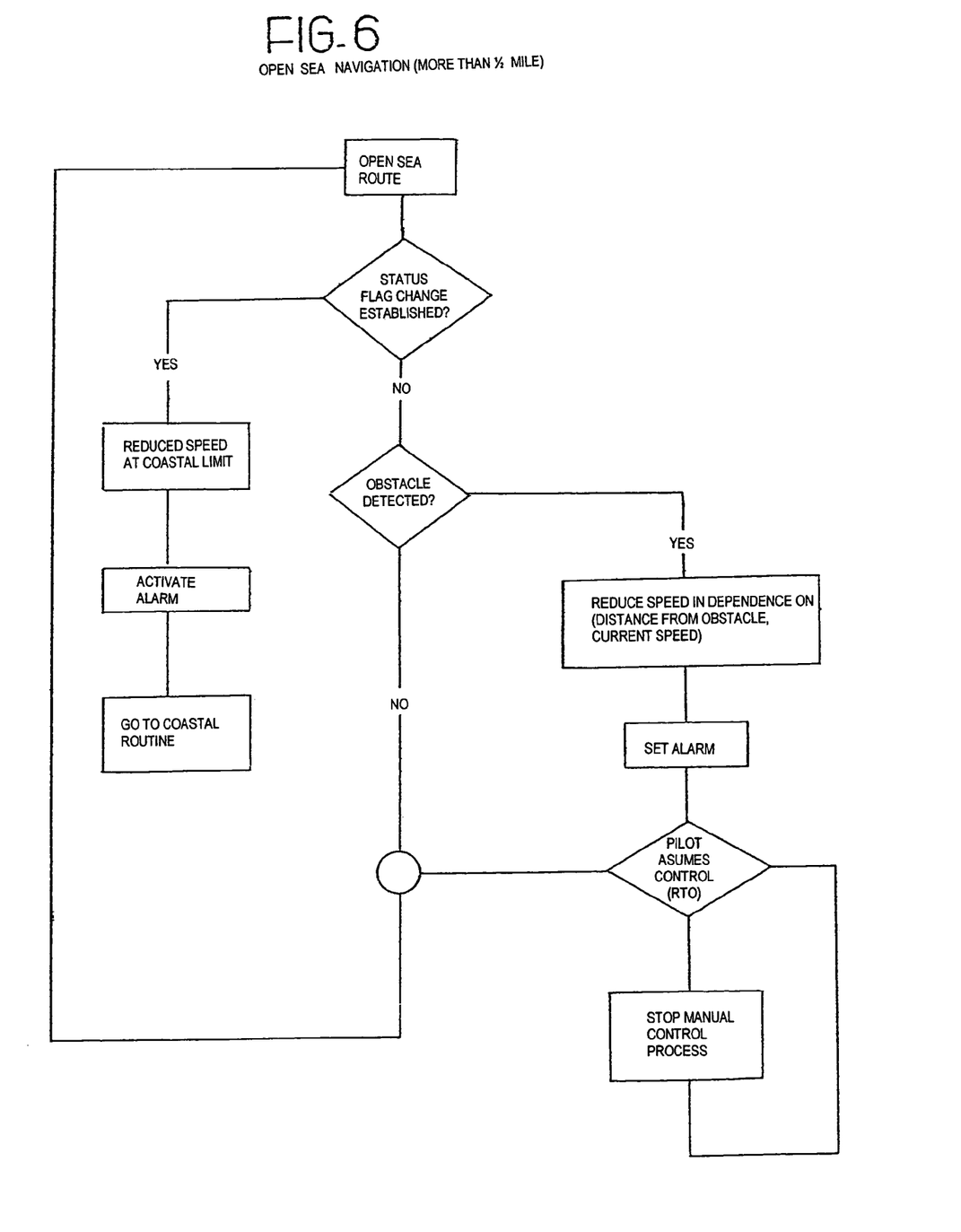
Figure 7:
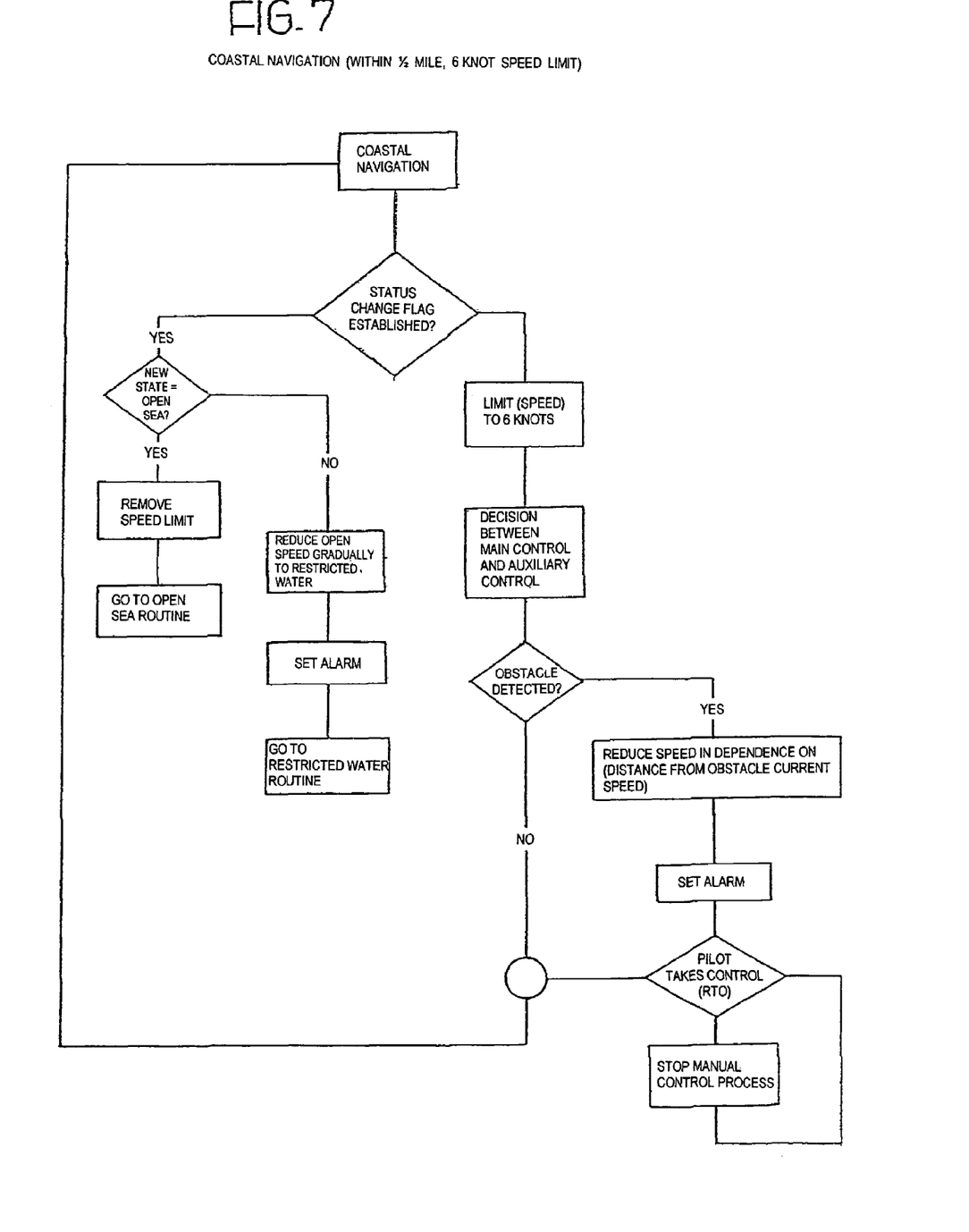
Figure 8:
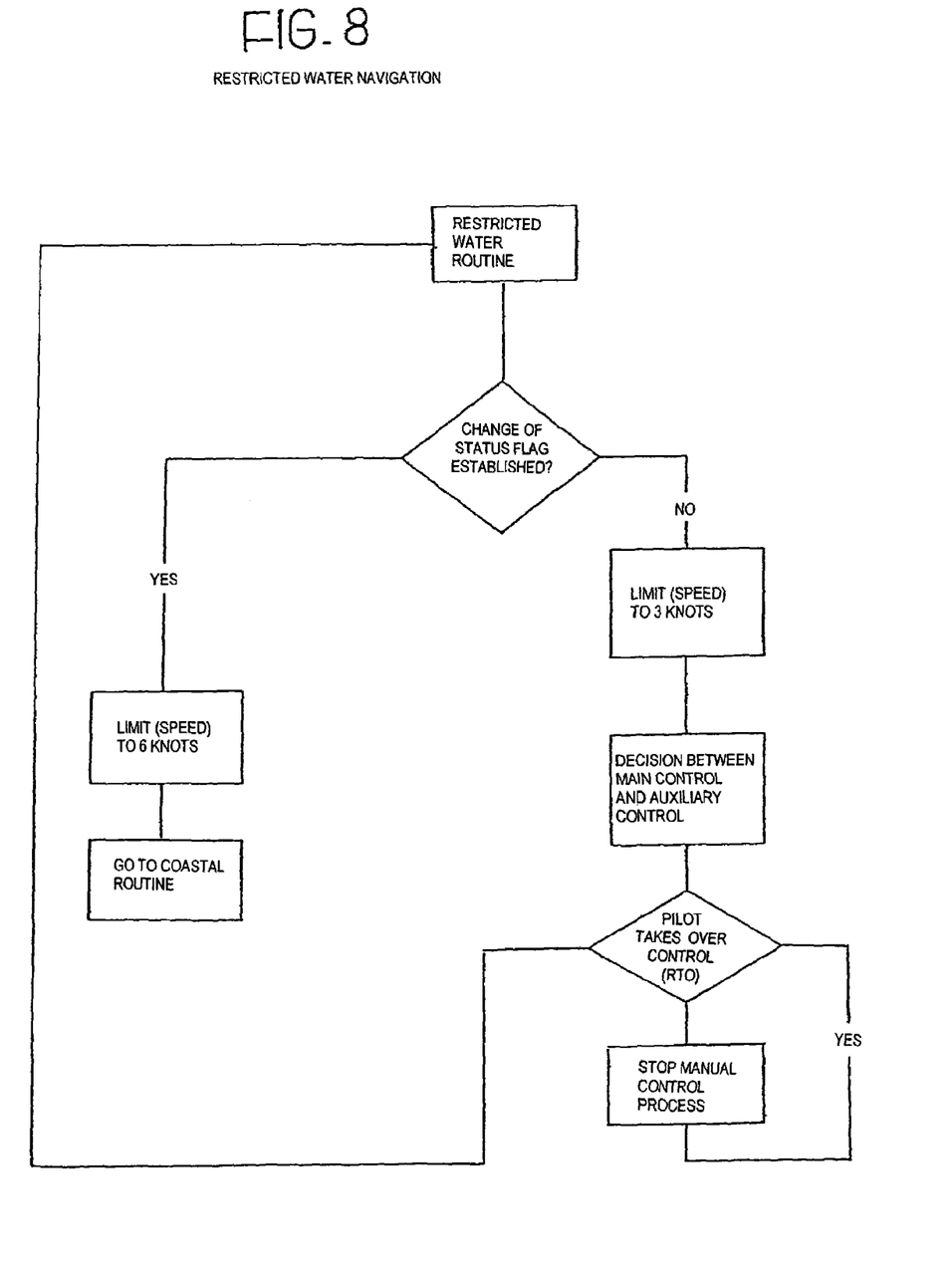
Figure 9:
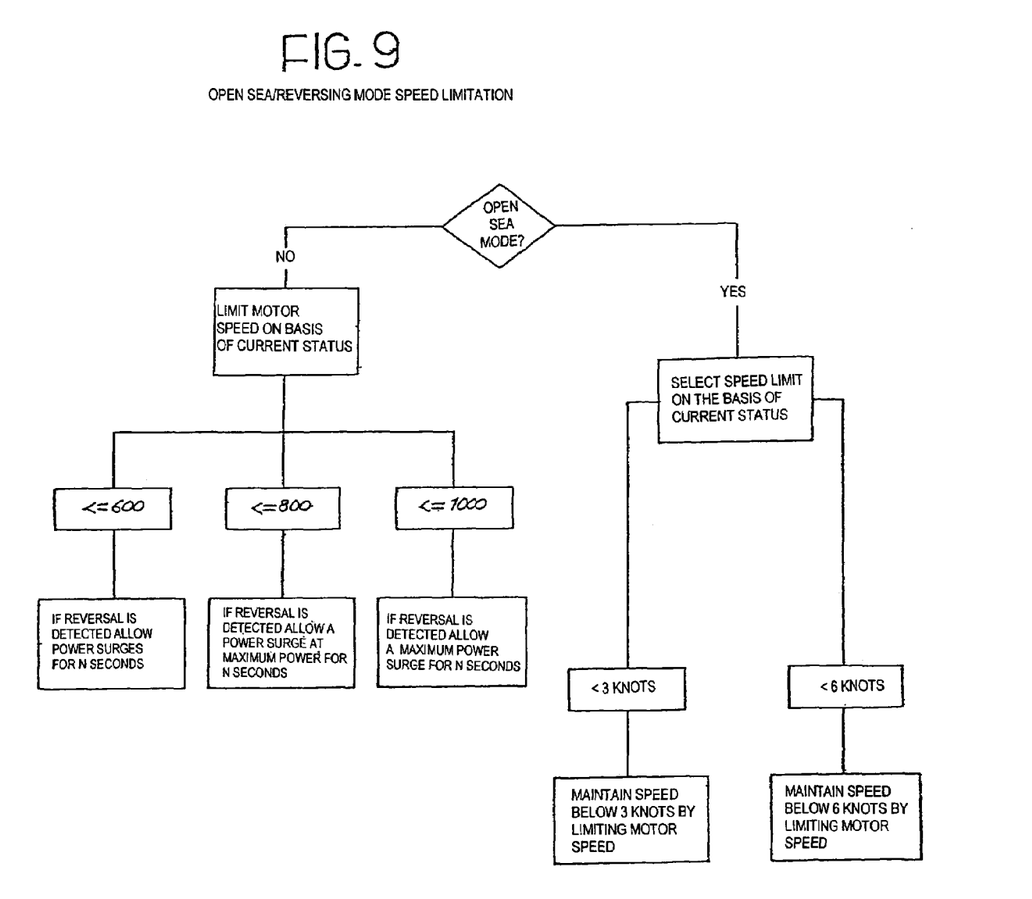
Figure 10:
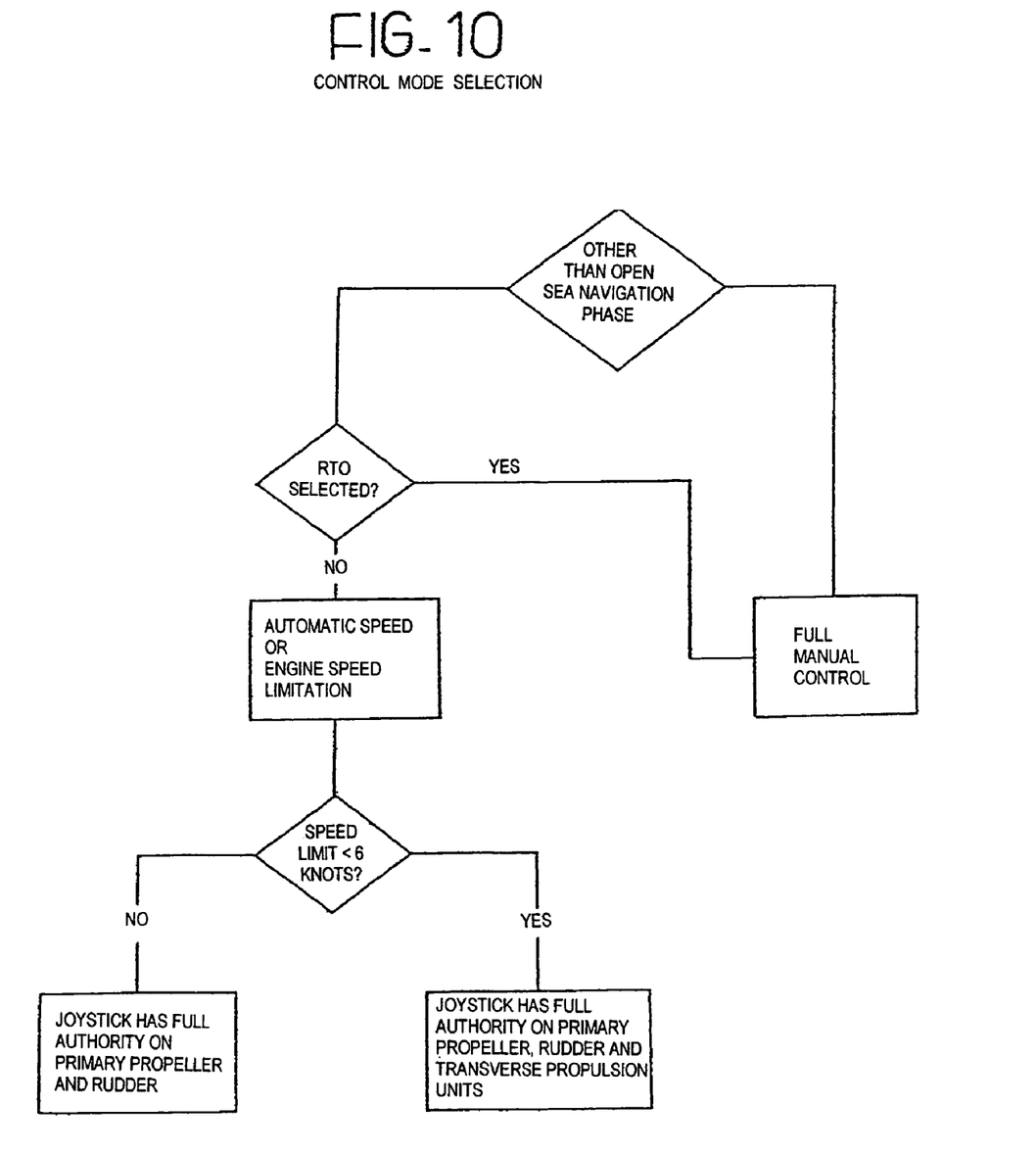
Figure 11:
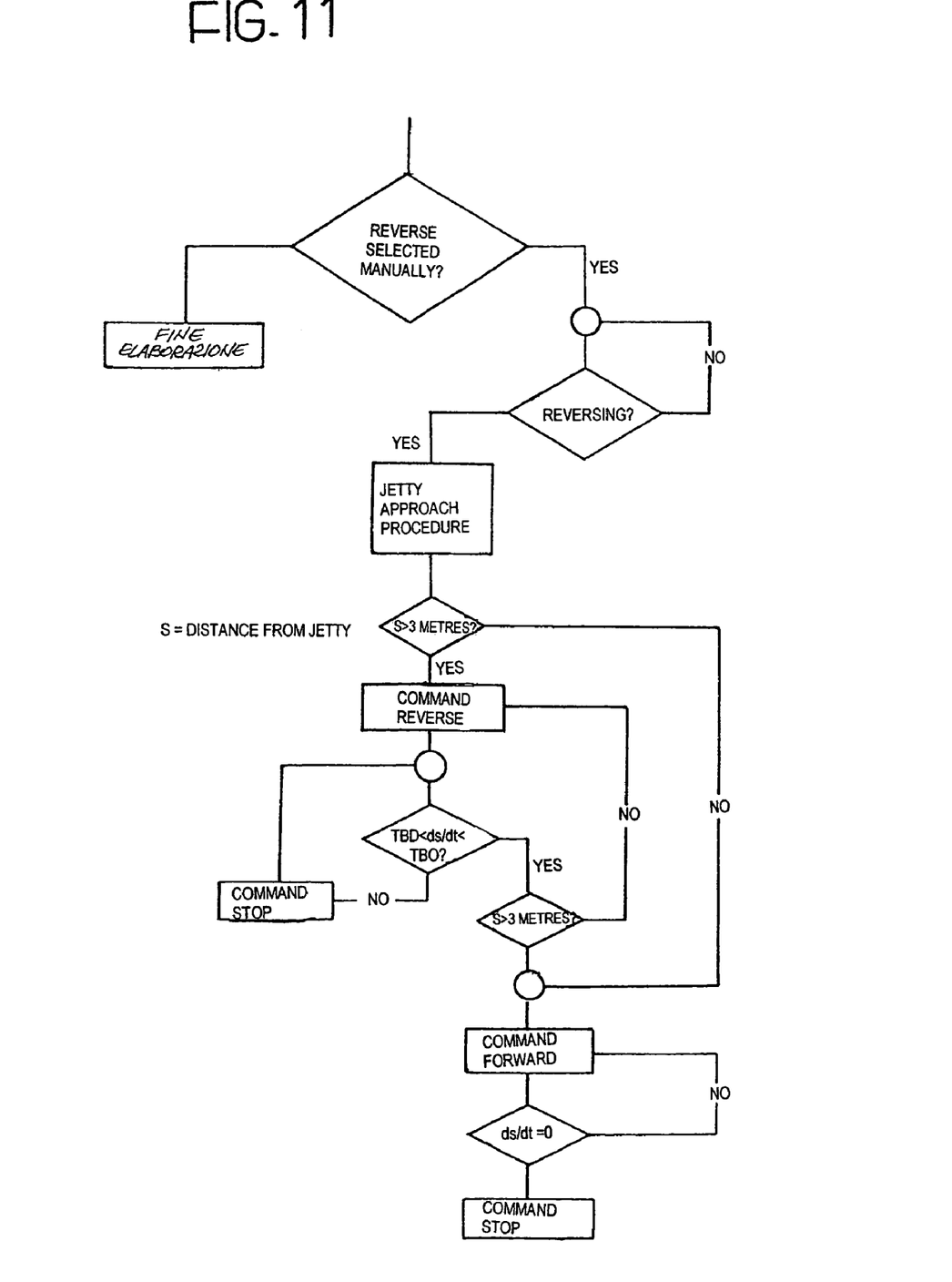

During the docking phase (illustrated in FIG. 2) the unit UC provides total control of the boat through the use of the joystick upon selecting the "reverse" control with the joystick. In this phase the joystick movements allow control of the motor speed by limiting the speed of rotation between idling and a maximum predetermined speed of revolution allowed in this manoeuvre (TBD).

The docking or "self docking" mode can be selected only manually. When this mode is active it allows controlled approach to the quay. Thanks to the stern sensors the unit UC controls approach to the quay in an automatic manner. The control of the motors is automatically cancelled upon reaching a predetermined safe distance; whenever the distance continues to reduce, the motors are automatically controlled in the opposite sense.

As already indicated above with reference to the self docking mode, in order to effect a sharp braking in emergency conditions the motors can be controlled in the opposite sense to a maximum predetermined speed for the purpose of guaranteeing braking efficacy. This is because the unit UC automatically intervenes to reduce the speed when the boat reaches predetermined distance limits from an obstacle, but allows full power from the motor to be available at any moment as long as the said speed limits are not exceeded. In the case of a sharp braking with reversal of the sense of rotation of the screws, the speed limitation will again intervene in an automatic manner upon reaching the limits in the opposite direction.

Naturally, the invention is not limited to the embodiment described and illustrated here, which is to be considered as an example of the system; the invention is however susceptible to modifications relating to the shape and arrangement of parts, constructional details and functioning. In particular the invention can be put into practice by means of only some and not necessarily all the detection equipment defined in the preceding embodiment.

What is claimed is:

1. A control system for a boat such as a yacht comprising:
   primary propulsion means (M1, H1; M2, H2) for producing a thrust in at least the longitudinal direction of the boat;
   at least one primary manual control device (C, C'; L1, L2) for controlling the primary propulsion means;
   transverse propulsion means (M3, H3) to produce a thrust transversely of the boat;
   a second control device (J) of joystick type for controlling the primary and the transverse propulsion means for navigation at slow speed or in docking maneuvers;
   at least one first apparatus (GPS, R) for making information on the instantaneous speed of the boat available in real time;
   at least one second detection apparatus for making information on the instantaneous distance between the boat and an obstacle available in real time;
   an electronic processing and control unit (UC) operatively connected to the said propulsion means, to the said control devices and to the said first and second apparatus for receiving and processing the said speed and distance information;
   the electronic unit is arranged such that when the boat is located at a distance from an obstacle less than a pre-determined distance the said unit
   automatically controls the propulsion means for reducing the speed of the boat below at least a pre-determined limit speed,
   automatically disables the first manual control device, and
   automatically enables the second joystick control device.

2. A control system according to claim 1, comprising at least one of the following as detection apparatus:
   radar apparatus;
   GPS satellite system;
   an echo scanner;
   a distance sensor system mounted at the stem and/or at the bow, comprising a plurality of receiver-transmitters (RT) which emit acoustic signals in the form of beams rearwardly at the stem and/or forwardly at the bow and which receive acoustic signals reflected from a possible obstacle projecting from the surface at a distance of about 1 to 15 meters meters from the boat.

3. A control system according to claim 2, wherein the said detection apparatus is radar apparatus or a GPS satellite system, and wherein the electronic control unit is arranged in such a way that when the boat is traveling at a distance greater than a first predetermined distance from the coast, the said unit
   automatically controls the propulsion means to allow the speed of the boat to be greater than the said predetermined speed limit,
   automatically enables the first manual control device, and
   automatically disables the second joystick control device.

4. A control system according to claim 3, wherein the electronic control unit is arranged in such a way that when the boat is traveling at a second pre-determined distance from the coast less than the said first predetermined distance, the said unit automatically controls the propulsion means further to reduce the speed to below a second speed limit lower than the first speed limit.

5. A control system according to claim 2, wherein the said detection apparatus is an echo scanner and wherein the electronic control unit is arranged in such a way that when the boat is traveling in deeper water than a first pre-determined depth the said unit
   automatically controls the propulsion means to allow the speed of the boat to be greater than the said predetermined speed limit,
   automatically enables the first manual control device, and
   automatically disables the second joystick control device.

6. A control system according to claim 5, wherein the electronic control unit is arranged in such a way that when the boat is traveling in shallower water than a second predetermined depth less than the first pre-determined depth, the said unit automatically controls the propulsion means to further reduce the speed below a second speed value less than the first speed value.

7. A control system according to claim 1, wherein the electronic control unit is operatively connected to a manual override control (RTO) to allow the power delivered from the propulsion means to be increased at any moment up to attainment of any of the said speed limits.

* * * * *